(12) United States Patent
Lee, Jr.

(10) Patent No.: US 12,385,599 B2
(45) Date of Patent: Aug. 12, 2025

(54) SCREED BEAM SUPPORT APPARATUS

(71) Applicant: Leslie Lee, Jr., Riverside, CA (US)

(72) Inventor: Leslie Lee, Jr., Riverside, CA (US)

( * ) Notice: Subject to any disclaimer, the term of this patent is extended or adjusted under 35 U.S.C. 154(b) by 183 days.

(21) Appl. No.: 18/211,625

(22) Filed: Jun. 20, 2023

(65) Prior Publication Data
US 2024/0426421 A1 Dec. 26, 2024

(51) Int. Cl.
*F16M 13/02* (2006.01)
*E04F 21/05* (2006.01)
*E04F 21/24* (2006.01)
*F16B 2/06* (2006.01)
*F16B 7/04* (2006.01)

(52) U.S. Cl.
CPC ........... *F16M 13/022* (2013.01); *E04F 21/05* (2013.01); *E04F 21/241* (2013.01); *F16B 2/065* (2013.01); *F16B 7/0493* (2013.01)

(58) Field of Classification Search
CPC ...... F16M 13/022; E04F 21/05; E04F 21/241; F16B 2/065; F16B 7/0493; E04G 21/10
See application file for complete search history.

(56) References Cited

U.S. PATENT DOCUMENTS

| | | | |
|---|---|---|---|
| 1,852,673 A | 4/1932 | Pilj | |
| 2,345,976 A | 4/1944 | Hillberg | |
| 3,301,513 A * | 1/1967 | Sugaya | F16L 3/24 248/228.6 |
| 3,539,208 A * | 11/1970 | Felice | F16C 11/106 403/90 |
| 4,102,587 A * | 7/1978 | Herb | F16L 3/00 403/231 |
| 4,371,330 A | 2/1983 | Heffernan | |
| 6,932,195 B1 * | 8/2005 | Hayman | F16B 2/10 182/178.1 |
| D559,663 S | 1/2008 | Gray | |
| 7,878,469 B2 | 2/2011 | Hasenoehrl | |
| D758,833 S | 6/2016 | Stites | |
| 10,123,647 B1 * | 11/2018 | Mustafa | F16B 7/0433 |
| 10,174,511 B2 | 1/2019 | Lutes | |
| 10,376,086 B1 * | 8/2019 | Mustafa | A47H 1/122 |
| 11,766,122 B1 * | 9/2023 | Fan | F16B 2/12 248/231.71 |
| 2003/0199738 A1 * | 10/2003 | Yager | A61B 90/57 600/227 |
| 2009/0065660 A1 * | 3/2009 | Hasenoehrl | E04G 21/10 248/125.2 |
| 2010/0303543 A1 * | 12/2010 | Myers | F16B 2/12 403/374.3 |
| 2012/0090139 A1 * | 4/2012 | Scoggins | F16B 2/065 24/456 |
| 2013/0020447 A1 * | 1/2013 | Heath | F16B 2/065 248/58 |

(Continued)

FOREIGN PATENT DOCUMENTS

WO WO02059436 8/2002

*Primary Examiner* — Gisele D Ford

(57) ABSTRACT

A screed beam support apparatus for supporting a screed beam at a desired height above a ground surface includes a clamp and a hook. The clamp secures the hook to a vertical post to position the screed beam at the desired height. The clamp uses a set screw with a handle that extends perpendicularly to the set screw. The handle facilitates increasing a torque applied to the set screw by a user via a lever action.

10 Claims, 5 Drawing Sheets

(56) References Cited

U.S. PATENT DOCUMENTS

| | | | |
|---|---|---|---|
| 2016/0377101 A1* | 12/2016 | Jiang | F16B 2/065 24/522 |
| 2018/0051733 A1* | 2/2018 | Schultz | A01G 9/12 |
| 2020/0063898 A1* | 2/2020 | Ohnemus | F16L 3/1091 |
| 2020/0346323 A1* | 11/2020 | Gunn | F16B 2/065 |
| 2020/0370575 A1* | 11/2020 | Lin | B60P 7/083 |
| 2021/0328322 A1* | 10/2021 | Walker | F16B 2/12 |
| 2023/0074536 A1 | 3/2023 | Baggaley | |

\* cited by examiner

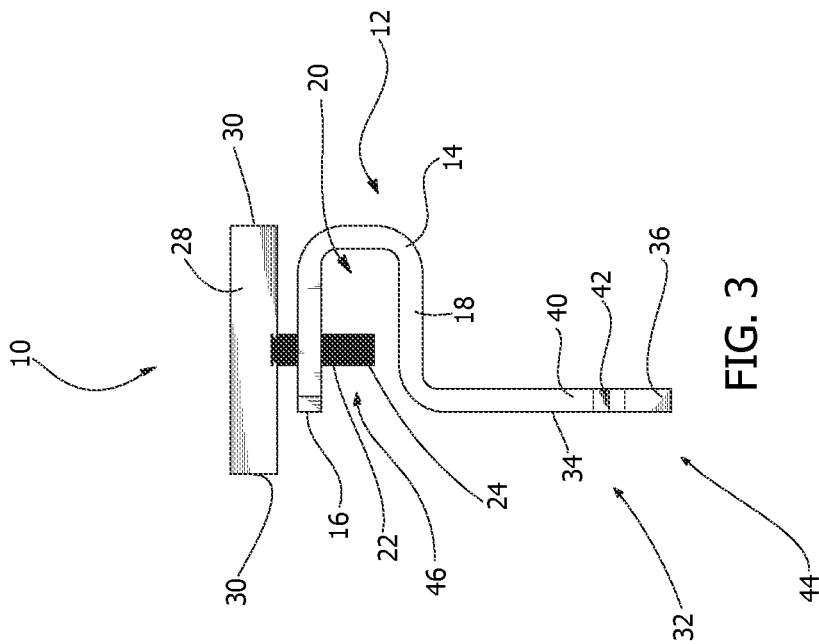
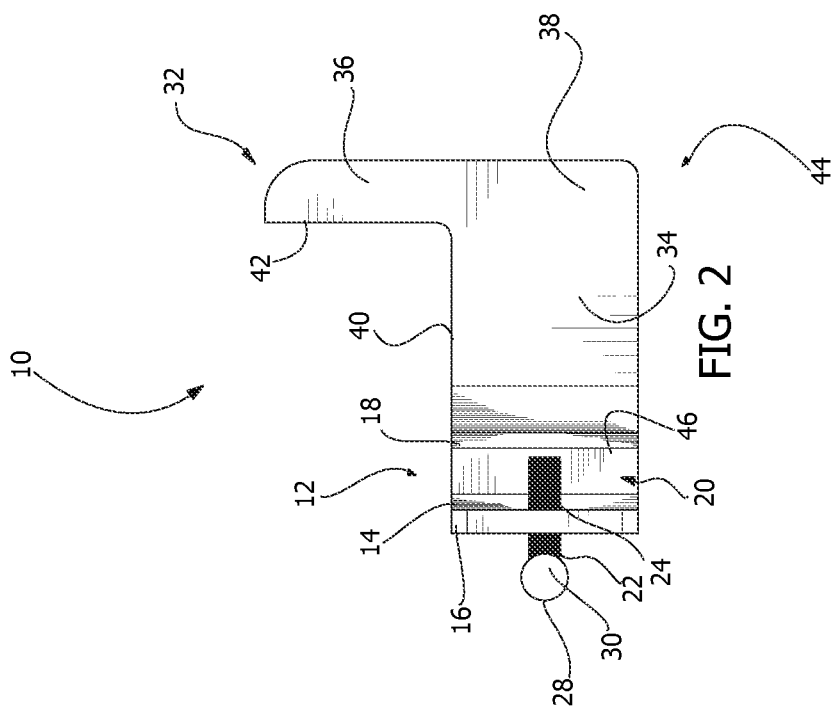

SCREED BEAM SUPPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to screed beam support apparatus and more particularly pertains to a new screed beam support apparatus for supporting a screed beam at a desired height above a ground surface.

(2) Description of Related Art Including Information Disclosed Under 37 CFR 1.97 and 1.98

The prior art discloses screed beam support apparatuses comprising a hook and a clamp to support a screed beam at a desired height above a ground surface to align a top surface of freshly poured concrete. However, the prior art suffers from an enduring flaw in that the set screws used for securing the clamp to a post have a hex head or similar that requires a tool for operation. Especially for applications requiring several of these apparatuses, locating a suitable tool increases the time spent setting the positions of the clamps and operating the tool can be cumbersome with relatively small fasteners. U.S. Pat. No. 10,174,511 (the '511 patent) discloses a screed beam support apparatus which provides a grip for hand-tightening the set screw and enhance a torque exerted by a user on the set screw. However, the '511 patent and the rest of the prior art fails to describe an elongated handle which forms a T-shape with the set screw.

Such a handle is advantageous over the grip of the '511 patent and the set screws of the prior art at least in part because such a handle has a greater surface area that extends substantially radially from a center axis of the set screw for a given volume of material. The increased radially extending surface area reduces slippage during operation over a grip such as in the '511 patent which, despite including grooves, notches, or similar friction-enhancing devices, requires a user to grip a surface which extends substantially circumferentially around the center axis of the set screw.

BRIEF SUMMARY OF THE INVENTION

An embodiment of the disclosure meets the needs presented above by generally comprising a clamp having a body, a set screw, and a handle. The body has a first portion and a second portion which are coupled together. The body defines a channel between the first portion and the second portion and is configured to slidably receive a post through the channel. The set screw extends through the first portion of the body and has external threads which engage internal threads of the first portion. The set screw is rotatable to move the set screw alternately toward and away from the second portion. The set screw and the second portion of the body are configured to cooperatively clamp the post therebetween to secure the clamp at a selected position along the post. The handle is coupled to the set screw outside of the channel and is elongated between a pair of ends and is oriented perpendicularly to the set screw.

The hook is coupled to the clamp and has a first segment and a second segment. The first segment is coupled to and extends away from the clamp, and the second segment is coupled to and extends upwardly from a distal end of the first segment with respect to the clamp. The first segment has an upper surface such that the first segment is configured for supporting a screed beam. The second segment has an engagement surface which extends upwardly from the upper surface of the first segment and is configured for retaining the screed beam against the post.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a side view of the first embodiment of the disclosure.

FIG. 3 is a top view of the first embodiment of the disclosure.

DETAILED DESCRIPTION OF THE INVENTION

Figure 1:
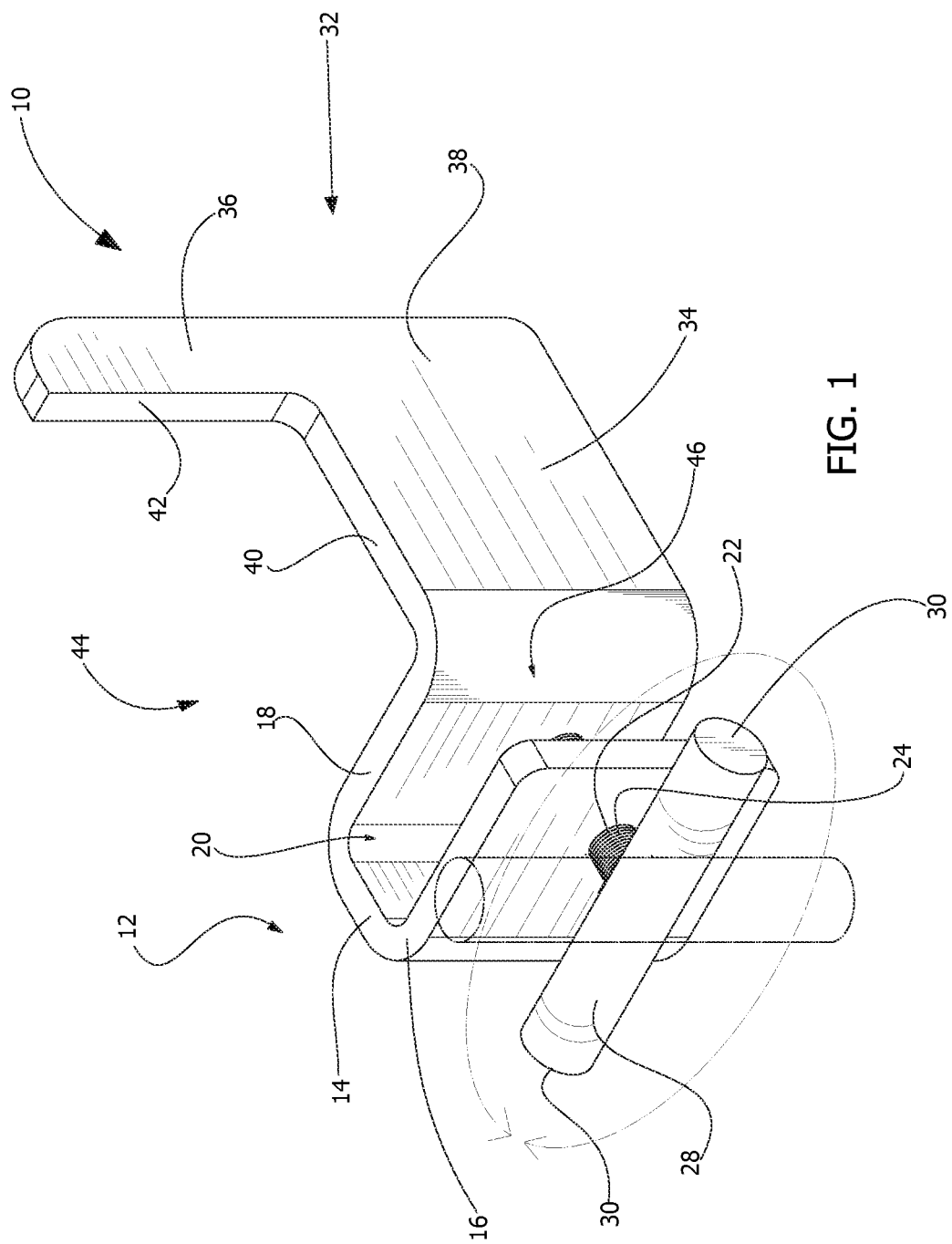
FIG. 1 is a perspective view of a screed beam support apparatus according to a first embodiment of the disclosure.
Figure 4:
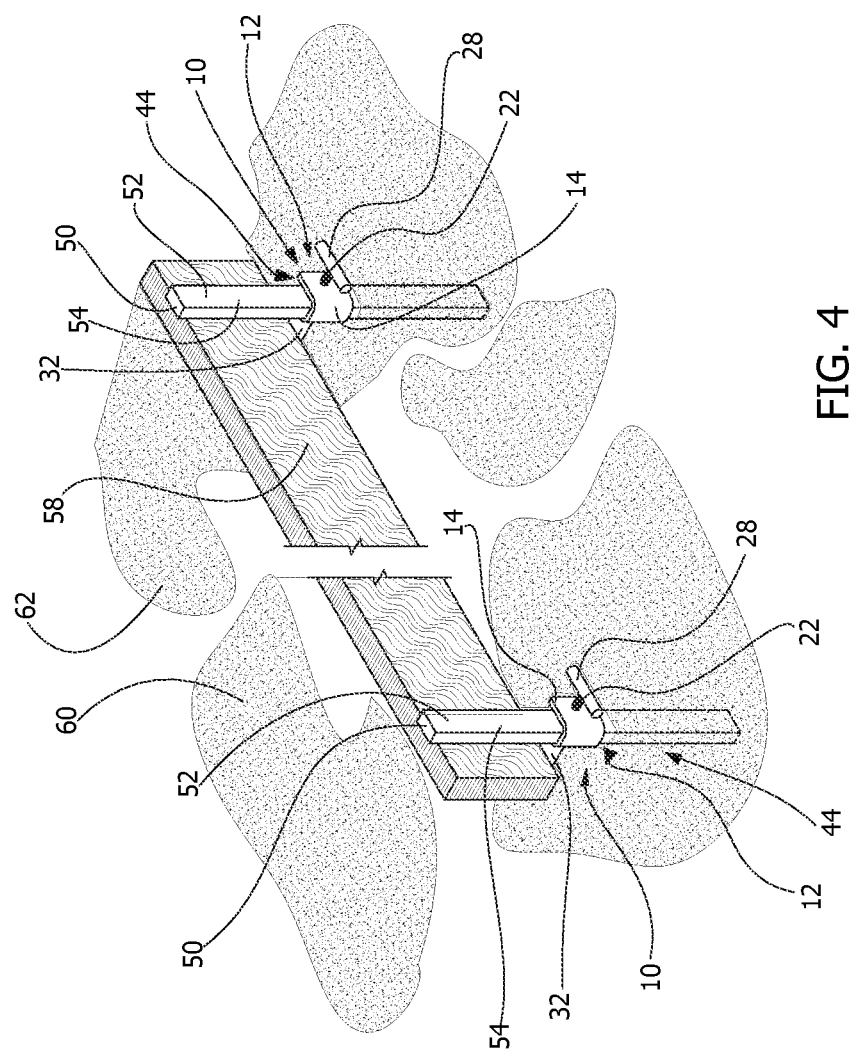
FIG. 4 is a perspective in-use view of the first embodiment of the disclosure.
Figure 5:
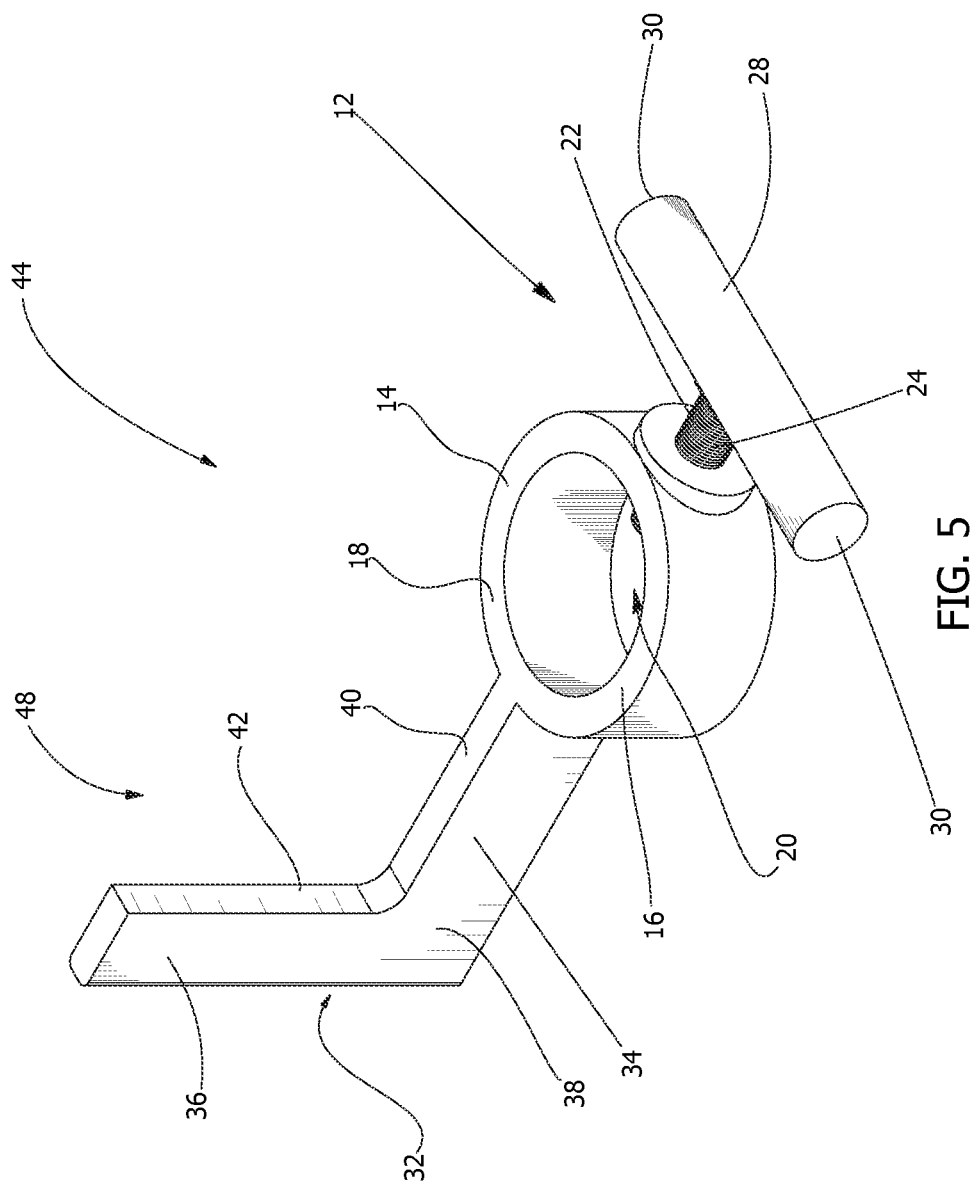
FIG. 5 is a perspective view of a second embodiment of the disclosure.
Figure 6:
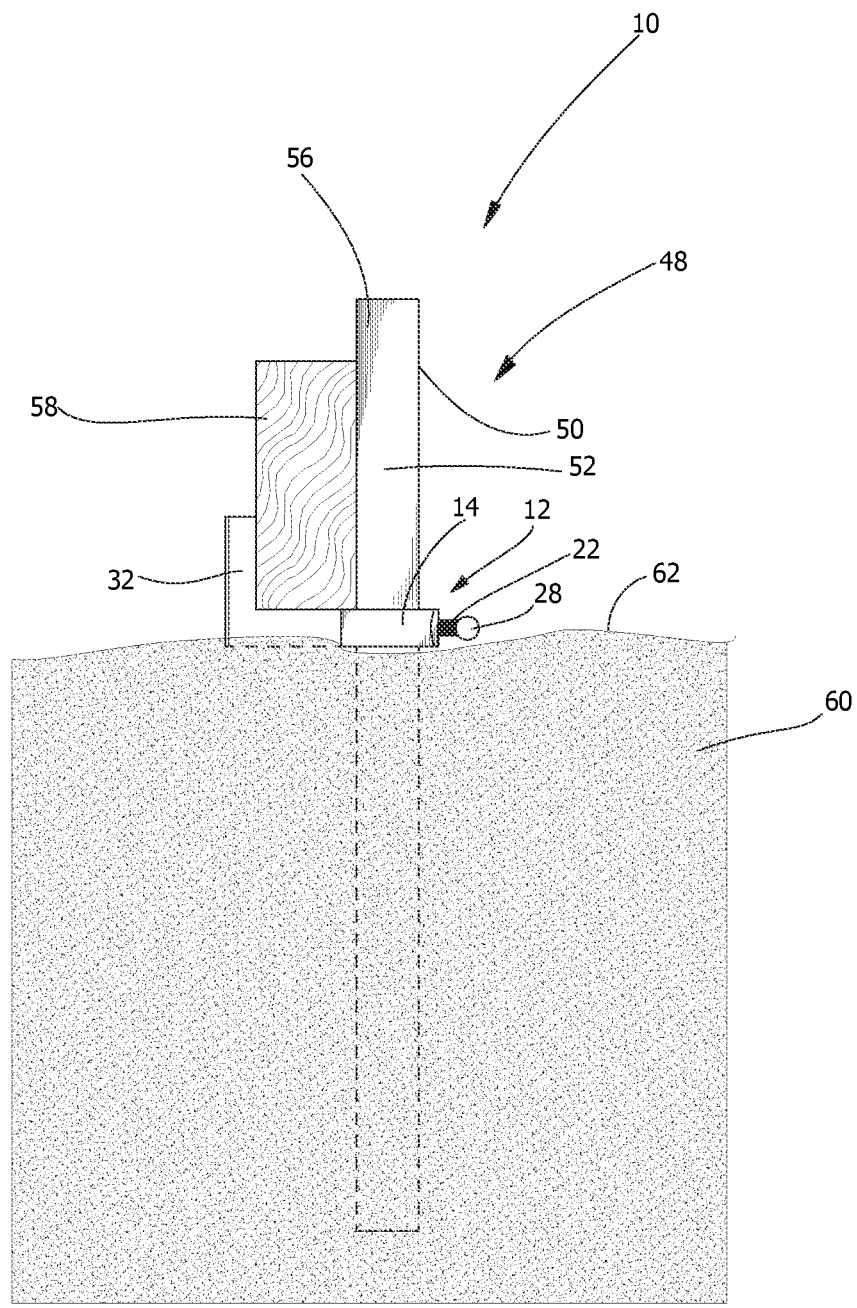
FIG. 6 is a side in-use view of the second embodiment of the disclosure.

With reference now to the drawings, and in particular to FIGS. 1 through 6 thereof, a new screed beam support apparatus embodying the principles and concepts of an embodiment of the disclosure and generally designated by the reference numeral 10 will be described.

As best illustrated in FIGS. 1 through 6, the screed beam support apparatus 10 generally comprises a clamp 12 with a body 14, a set screw 22, and a handle 28. The body 14 has a first portion 16 and a second portion 18 which are coupled together. The body 14 defines a channel 20 between the first portion 16 and the second portion 18, and the body 14 is configured to slidably receive a post 50 through the channel 20. The channel 20 has a shape such that the channel 20 is configured to be complementary in shape to a circumferential surface 52 of the post 50. The set screw 22 extends through the first portion 16 of the body 14. The set screw 22 has external threads 24 which engage internal threads (not shown) of the first portion 16. The set screw 22 is rotatable to move the set screw 22 alternately toward and away from the second portion 18. The set screw 22 and the second portion 18 of the body 14 are configured to cooperatively clamp 12 the post 50 therebetween to secure the clamp 12 at a selected position along the post 50. The handle 28 is coupled to the set screw 22 outside of the channel 20. The handle 28 is elongated between a pair of ends 30 and is oriented perpendicularly to the set screw 22. The set screw 22 is positioned between the pair of ends 30 of the handle 28 and has a cylindrical shape.

A hook 32 is coupled to the clamp 12 and has a first segment 34 and a second segment 36. The first segment 34 is coupled to and extends away from the clamp 12. The second segment 36 is coupled to and extends upwardly from a distal end 38 of the first segment 34 with respect to the clamp 12. The first segment 34 has an upper surface 40 such that the first segment 34 is configured for supporting a screed beam 58. The second segment 36 has an engagement surface 42 extending upwardly from the upper surface 40 of the first segment 34 such that the second segment 36 is configured for retaining the screed beam 58 against the post 50. The upper surface 40 of the first segment 34 is oriented horizontally and is oriented perpendicularly to the engagement surface 42 of the second segment 36. The body 14 of the clamp 12 and the hook 32 are integrally formed.

In a first embodiment 44, a cross section of the channel 20 taken horizontally has a rectangular shape. The body 14 has an opening 46 extending horizontally therethrough to the channel 20 such that the body 14 can receive the post 50 into the channel 20 through the opening 46. In a second embodiment 48, a cross section of the channel 20 taken horizontally has a circular shape. The body 14 of the second embodiment 48 is adapted to receive a cylindrical post 56 into the channel 20 and may be pivoted about a longitudinal axis of the cylindrical post 56 to orient the body 14 as desired. The body 14 of the first embodiment 44 is adapted to receive a rectangular post 54 into the channel 20.

In use, the post 50 is oriented vertically such that the clamp 12 may be secured to the post 50 at a desired height. The handle 28 of the clamp 12 enhances the ability of a user to apply enough torque to secure the clamp 12 to the post 50 via a lever action. The screed beam 58 is supported on the upper surface 40 of the first segment 34 of the hook 32 and between the engagement surface 42 of the second segment 36 of the hook 32 and the post 50. Multiple screed beam support apparatuses 10 may be attached to multiple posts 50 such that the screed beam 58 may be supported across multiple hooks 32. The screed beam 58 is set in such a position to align a top surface 62 of freshly poured concrete 60, cement, or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A screed beam support apparatus comprising:
    a clamp comprising:
        a body having a first portion and a second portion being coupled together, the body defining a channel between the first portion and the second portion, the body being configured to slidably receive a post through the channel;
        a set screw extending through the first portion of the body, the set screw having external threads engaging internal threads of the first portion, the set screw being rotatable to move the set screw alternately toward and away from the second portion, the set screw and the second portion of the body being configured to cooperatively clamp the post therebetween to secure the clamp at a selected position along the post; and
        a handle being coupled to the set screw outside of the channel, the handle being elongated between a pair of ends and being oriented perpendicularly to the set screw;
    a hook being coupled to the clamp and having a first segment and a second segment, the first segment being coupled to and extending perpendicularly away from the clamp, the second segment being coupled to and extending perpendicularly from a distal end of the first segment with respect to the clamp, the second segment being coplanar with an opening into the channel opposite a closed base end of the channel, the first segment having an upper surface such that the first segment is configured for supporting a screed beam, the second segment having an engagement surface extending upwardly from the upper surface of the first segment, the engagement surface being configured for retaining the screed beam against the post.

2. The apparatus of claim 1, wherein the channel has a shape such that the channel is configured to be complementary in shape to a circumferential surface of the post.

3. The apparatus of claim 1, wherein the set screw is positioned between the pair of ends of the handle.

4. The apparatus of claim 3, wherein the handle has a cylindrical shape.

5. The apparatus of claim 1, wherein the upper surface of the first segment is oriented horizontally, the upper surface of the first segment being oriented perpendicularly to the engagement surface of the second segment.

6. The apparatus of claim 1, wherein the body of the clamp and the hook are integrally formed.

7. The apparatus of claim 1, wherein a cross section of the channel taken horizontally has a rectangular shape.

8. The apparatus of claim 7, wherein the body has an opening extending horizontally therethrough to the channel.

9. A screed beam support apparatus comprising:
   a clamp comprising:
      a body having a first portion and a second portion being coupled together, the body defining a channel between the first portion and the second portion, the body being configured to slidably receive a post through the channel, the channel having a shape such that the channel is configured to be complementary in shape to a circumferential surface of the post;
      a set screw extending through the first portion of the body, the set screw having external threads engaging internal threads of the first portion, the set screw being rotatable to move the set screw alternately toward and away from the second portion, the set screw and the second portion of the body being configured to cooperatively clamp the post therebetween to secure the clamp at a selected position along the post; and
      a handle being coupled to the set screw outside of the channel, the handle being elongated between a pair of ends and being oriented perpendicularly to the set screw, the set screw being positioned between the pair of ends of the handle, the handle having a cylindrical shape; and
   a hook being coupled to the clamp and having a first segment and a second segment, the first segment being coupled to and extending perpendicularly away from the clamp, the second segment being coupled to and extending perpendicularly from a distal end of the first segment with respect to the clamp, the second segment being coplanar with an opening into the channel opposite a closed base end of the channel, the first segment having an upper surface such that the first segment is configured for supporting a screed beam, the second segment having an engagement surface extending upwardly from the upper surface of the first segment, the engagement surface being configured for retaining the screed beam against the post, the upper surface of the first segment being oriented horizontally, the upper surface of the first segment being oriented perpendicularly to the engagement surface of the second segment;
   wherein the body of the clamp and the hook are integrally formed.

10. The apparatus of claim 9, wherein a cross section of the channel taken horizontally has a rectangular shape, the body having an opening extending horizontally therethrough to the channel.

* * * * *